United States Patent Office 2,971,394
Patented Feb. 14, 1961

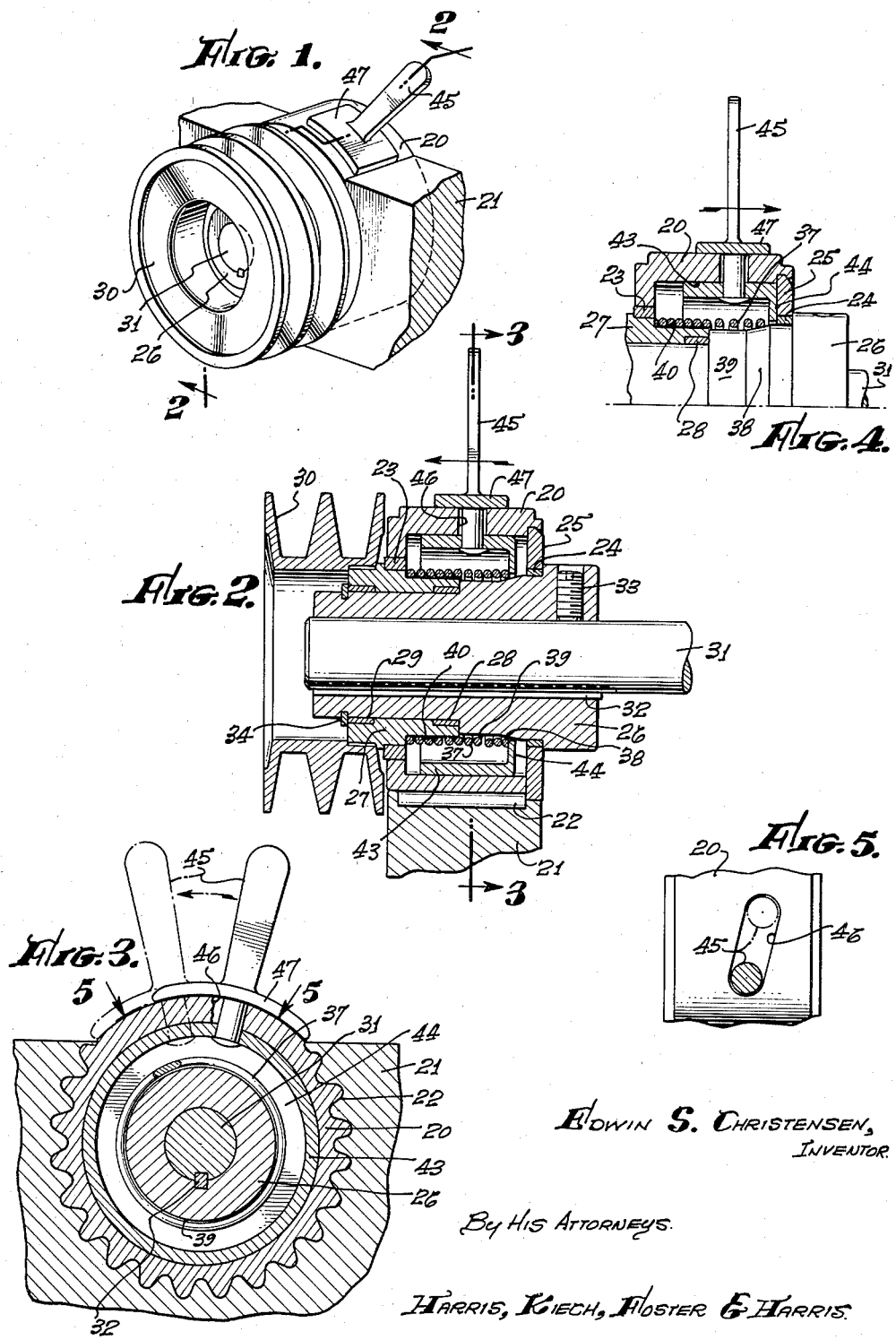

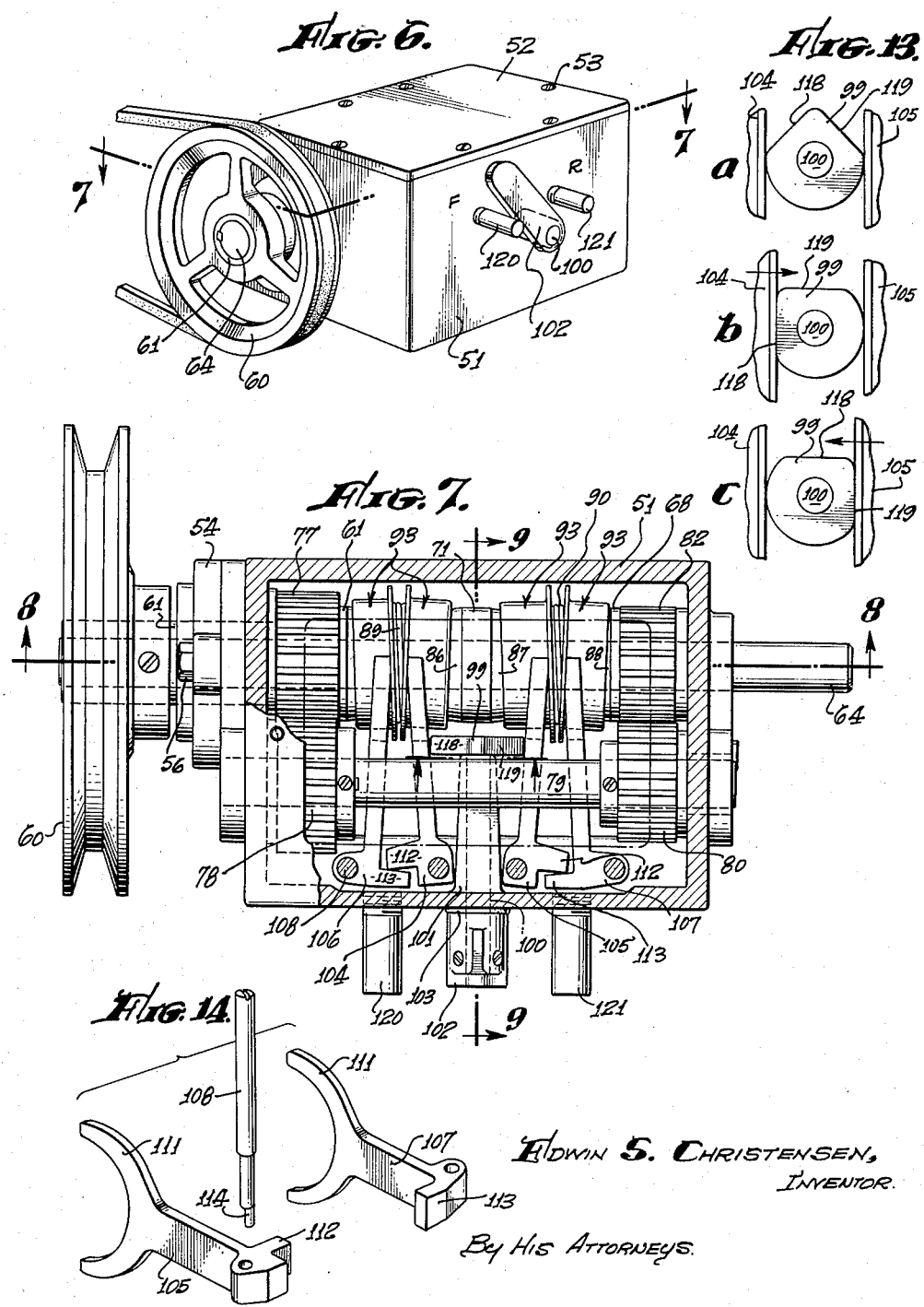

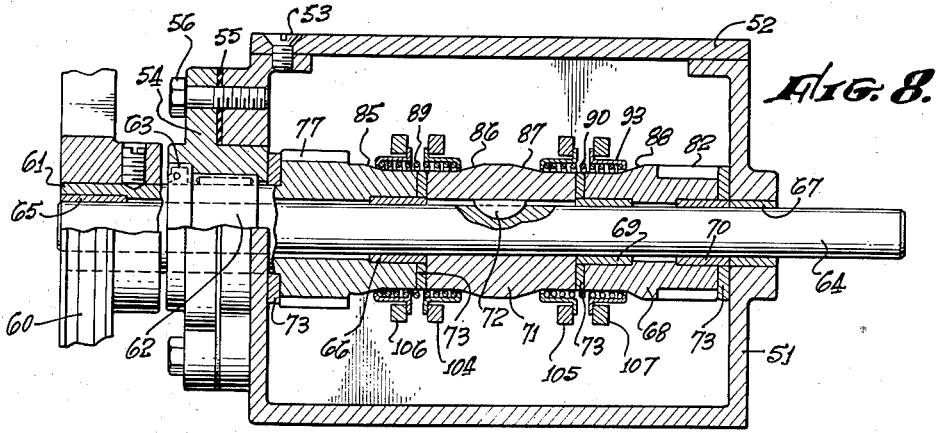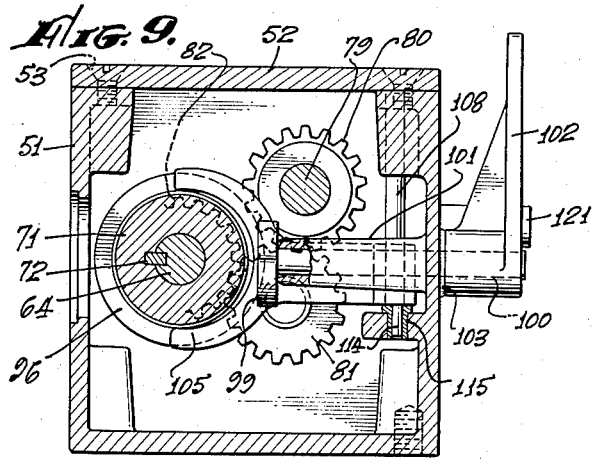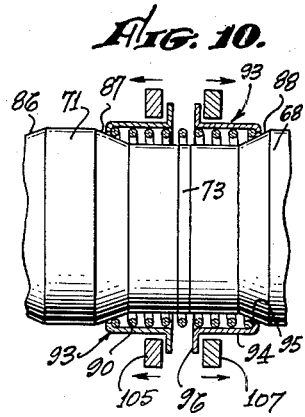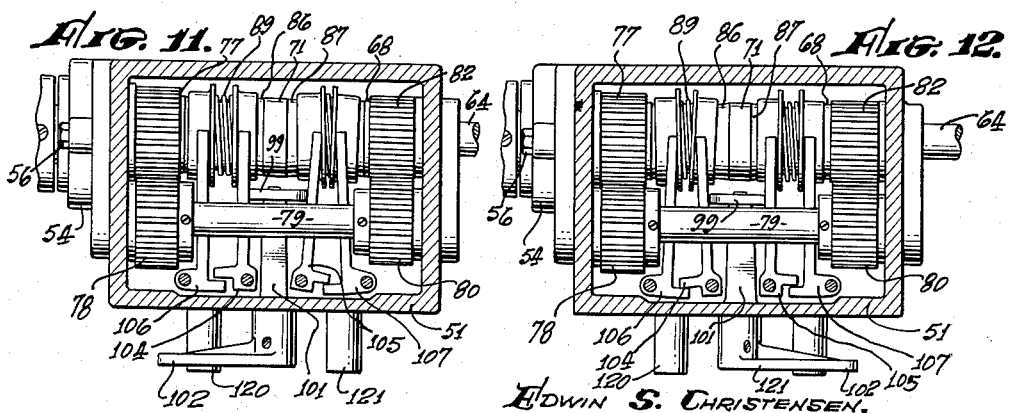

2,971,394
TRANSMISSION
Edwin S. Christensen, 2203 N. Santa Fe Ave., Compton, Calif.
Filed Mar. 24, 1958, Ser. No. 723,222
5 Claims. (Cl. 74—377)

This invention relates to transmissions and to a novel clutch mechanism suitable for use in both single and multispeed transmissions.

It is an object of the invention to provide a clutch mechanism which is simple and inexpensive to manufacture and rugged and durable in use and one which is especially suited for high-torque, low-speed operation.

It is another object of the invention to provide a coil spring for coupling the input and output members with the turns of the spring winding away from the input member toward the output member in a direction opposite to the direction of rotation of the input member and with one or both ends of the spring constrained to a maximum diameter for engaging one or two tapered surfaces on the rotating members, the clutch being disengaged by axially compressing the spring. A further object of the invention is to provide such a clutch which can be used in multiples to provide a multispeed transmission.

It is another object of the invention to provide a novel lever and cam arrangement for controlling a single speed transmission using the clutch of the invention and for controlling a dual speed transmission using the clutch of the invention.

The invention also comprises novel details of construction and novel combinations and arrangements of parts, which will more fully appear in the course of the following description. The drawings merely show and the description merely describes preferred embodiments of the present invention which are given by way of illustration or example.

In the drawings:

Fig. 1 is an isometric view of a single speed transmission using the clutch of the invention;

Fig. 2 is a sectional view taken along the line 2—2 of Fig. 1 showing the clutch in the disengaged condition;

Fig. 3 is a sectional view taken along the line 3—3 of Fig. 2;

Fig. 4 is a partial sectional view similar to that of Fig. 2 showing the clutch in the engaged condition;

Fig. 5 is a view taken along the line 5—5 of Fig. 3;

Fig. 6 is an isometric view of a dual speed transmission utilizing the clutch of the invention;

Fig. 7 is a sectional view taken along the line 7—7 of Fig. 6 with the unit in the neutral positions;

Fig. 8 is a sectional view taken along the line 8—8 of Fig. 7;

Fig. 9 is a sectional view taken along the line 9—9 of Fig. 7;

Fig. 10 is an enlarged view of one on the clutches of Fig. 8 in the engaged condition;

Fig. 11 is a reduced view similar to that of Fig. 7 showing the transmission in the forward position;

Fig. 12 is a reduced view similar to that of Fig. 7 showing the transmission in the reverse position;

Figs. 13a, b, and c, are sectional views taken along the line 13—13 of Fig. 7 showing the shifting cam in the neutral, forward, and reverse positions, respectively; and Fig. 14 is an exploded view showing one of the sets of shifting levers.

Referring now to the structure of Figs. 1 through 5, the clutch includes a housing or stationary member 20 fixed in a frame 21 by suitable means, such as by the engagement of a convoluted outer surface 22 of the housing with a corresponding inner surface of the frame. A bearing 23 is fitted in one end of the housing 20 and another bearing 24 is fitted in an end plate 25 which closes the other end of the housing. A sleeve 26 is journalled in the bearing 24 and another sleeve 27 is journalled in the bearing 23, these sleeves being concentrically positioned with bearings 28, 29 permitting relative rotation. A pulley 30 is pressed on the sleeve 27 and a shaft 31 is fixed in the sleeve 26 with a key 32 and set screw 33. The sleeves 26 and 27 are inserted into the housing 20 from opposite sides and are held together by a snap ring 34 positioned in a groove in the sleeve 26.

When in use, one of the sleeves is a driving member and the other is a driven member, the sleeves being coupled by a spring 37. In the particular embodiment illustrated, the sleeve 27 with the pulley thereon is the driving member and the sleeve 26 with the shaft 31 therein is the driven member; however, the clutch will operate equally well with the functions of the members reversed. One end of the spring 37 is fixed to one of the sleeves and the other is fixed to the other sleeve when the clutch is engaged and means are provided for loosening the spring from at least one of the sleeves to disengage the clutch.

The sleeve 26 has a tapered surface 38 which faces the sleeve 27, the tapered surface 38 preferably terminating in a cylindrical surface 39 which is in alignment with a cylindrical surface 40 of the sleeve 27. The surface 39 is of a lesser diameter than the surface 40 and may be omitted if desired. The spring 37 is a coil spring with the maximum diameter of the end turn adjacent the tapered surface 38 fixed by suitable means such as by welding or brazing the end of the spring to the adjacent turn. This end of the spring is preferably ground flat for smoother engagement with the clutch release mechanism to be described. A tang or other suitable means may be provided for engaging the other end of the spring to the sleeve 27. However, a preferred construction is shown in Fig. 2 wherein several turns adjacent the other end of the spring are positioned around the cylindrical surface 40.

The shifting mechanism of the clutch provides means for compressing the spring and includes a cup 43 axially slidable within the housing 20. The cup has an apertured bottom plate 44 which engages the constrained end of the spring when the cup is moved to the disengaged position as shown in Fig. 2. This movement of the cup compresses the spring and moves it out of engagement with the tapered surface 38. When the cup is moved to the engaged position as shown in Fig. 4, the spring is permitted to expand axially and engage the tapered surface 38.

A shift lever 45 is fixed to the cup 43, the lever moving in an oblique slot 46 in the housing 20 and having a cover plate 47 for covering the slot. Movement of the lever 45 from the disengaged position as shown in solid lines in Fig. 3 to the engaged position as shown in phantom lines in Fig. 3 simultaneously rotates and axially traverses the cup between the positions shown in Figs. 2 and 4 for controlling the position of the constrained end of the spring adjacent the tapered surface.

The turns of the spring 37 wind about the axis of the rotating sleeves away from the sleeve 27 toward the sleeve 26 in a direction opposite to the direction of rotation of the sleeve 27. That is, if the pulley 30 and sleeve 27 rotate in a positive or a clockwise direction, the turns of the spring as they advance from the sleeve 27 toward the sleeve 26 will move in a negative or counterclockwise direction. When in operation, one of the sleeves, say the sleeve 27 with the pulley 30, will be driven continuously in a positive direction. When the clutch is disengaged as shown in Fig. 2, the turns of the spring will loosely contact the cylindrical surface 39, transmitting no rotation to the sleeve 26. When the clutch is shifted to the engaged position as shown in Fig. 4, the constrained end of the spring is permitted to engage the tapered surface of the sleeve 26 causing the turns of the spring to tighten around the sleeve 27 and the sleeve 26 thereby coupling the two sleeves together. The two sleeves are easily and quickly decoupled by moving the spring from engagement with the tapered surface.

An alternative embodiment of the invention is shown in Figs. 6 through 14 wherein two clutches are used in a dual speed transmission. Each of the clutches in the dual speed transmission differs from the clutch of Figs. 1 through 5 in having two tapered surfaces facing each other with both ends of the spring constrained. Of course, the single taper unit of the single speed transmission could be used in the dual speed transmission and the double taper unit of the dual speed transmission could be used in the single speed transmission.

The dual speed transmission is contained in a housing or stationary member 51 having a top cover 52 attached by screws 53, and an end plate 54 and gasket 55 attached by bolts 56. Openings 57 and 58 in the housing 51 provide access to the interior thereof for assembly and maintenance. A pulley 60 is mounted on the outer end of a sleeve 61 which is journalled in a bearing 62 in the end plate 54, the sleeve 61 being mounted on a shaft 64 with bearings 65, 66 with the shaft 64 journalled in a bearing 67 in the opposite end of the housing (Fig. 8). A shaft seal 63 is positioned on the sleeve 61 between the bearing 62 and the pulley 60. A sleeve 68 is journalled on the shaft 64 with bearings 69, 70 and a sleeve 71 is fixed to the shaft 64 by a key 72, the sleeve 71 being positioned between the sleeves 61 and 68 with the sleeves being separated from each other and the walls of the housing by spacer bearings 73. This bearing structure permits each of the sleeves to rotate relative to the other sleeves and the housing.

Countershaft means are provided for driving the sleeve 68 at a predetermined ratio to the sleeve 61 and, in the embodiment illustrated herein, the sleeve 68 is driven in the reverse direction at the same speed as the sleeve 61. A spur gear 77 formed on the sleeve 61 meshes with a spur gear 78 mounted on a shaft 79 to drive the shaft, the shaft being journalled in the housing 51. A spur gear 80 also mounted on the shaft 79 drives an idler gear 81, journalled in the housing 51, which in turn drives a spur gear 82 formed on the sleeve 68.

A tapered surface 85 on the sleeve 61 faces a similar tapered surface 86 on the sleeve 71 and another tapered surface 87 on the sleeve 71 faces a similar tapered surface 88 on the sleeve 68 (Figs. 8 and 10). A coil spring 89 is positioned around the sleeves 68, 71, between the tapered surfaces 85, 86 and another coil spring 90 is positioned around the sleeves 71, 68 between the tapered surfaces 87, 88. Each end of each spring is constrained to a maximum diameter so that the spring will not expand and climb over the tapered surface engaged by the spring. This constraint may be obtained by welding the end of the spring to the adjacent turn as in the spring of Fig. 2. However, an alternative form is used herein, being best seen in Figs. 7 and 10. Each end of each spring is positioned in a cup 93, the cup having a cylindrical section 94 which controls the maximum diameter of the spring. The bottom of the cup is provided with an opening 95 for positioning about the corresponding sleeve, the engagement of the bottom of the cup with the end of the spring permitting axial compression of the spring. An outwardly turned flange 96 is formed at the other end of the cup to serve as a bearing surface for the lever which is used to compress the spring.

When the pulley 60 and sleeve 61 are rotated in a forward or positive direction, the spring 89 will be formed with the turns of the coil winding away from the surface 85 toward the surface 86 in a reverse or negative direction. When the spring is permitted to expand and engage both of these tapered surfaces, the sleeve 71 and shaft 64 will also be rotated in the forward or positive direction at the same speed as the pulley 60 and sleeve 61. With the pulley 60 and sleeve 61 rotated in the forward or positive direction, the sleeve 68 will be rotated in the reverse or negative direction through the countershaft structure. The turns of the spring 90 will wind away from the surface 88 toward the surface 87 in a forward or positive direction, this being the opposite direction to the rotation of the sleeve 68. When the spring 90 is permitted to expand and engage the surfaces 87 and 88, the sleeve 71 and shaft 64 will be rotated in the negative or reverse direction.

A shifting system is provided which compresses both of the springs for zero output, compresses only the spring 90 for output in the forward direction, and compresses only the spring 89 for output in the reverse direction. The shifting system includes a cam 99 mounted on a shaft 100 which in turn is journalled in a boss 101 projecting inward from a wall of the housing 51. A handle 102 is fixed to the exterior end of the shaft 100 with a gasket 103 between the handle and the housing. The cam engages levers 104, 105 which in turn engage levers 106, 107, respectively, each lever being mounted on a pivot shaft 108 (Figs. 7, 9, and 14).

Each lever has a bifurcated end 111 for engaging the flange of the corresponding cup 93 and applying an axial compression force to the spring within the cup. The lever 105 has an ear 112 which engages an ear 113 on the lever 107 when the lever 105 is pivoted clockwise to the position shown in Fig. 7, this engagement of the ears 112, 113 causing the lever 107 to pivot counterclockwise thereby compressing the spring 90 and disengaging the sleeves 68, 71. The levers 103 and 106 are similarly formed for compressing the spring 89. Each of the pivot shafts 108 has an eccentric end 114 mounted in a bushing 115 in the housing 51 (Figs. 9 and 14) permitting the pivot point of the lever mounted on the shaft to be changed by the rotation of the shaft for adjusting the operation of the lever.

The cam 99 is circular with two flats 118, 119. In Fig. 13a, the cam is shown in the neutral position with both levers 104 and 105 engaging the circular portion of the cam thereby compressing both of the clutch springs disengaging both clutches (see Fig. 7). In Fig. 13b, the cam is rotated to the forward position with the lever 104 engaging the flat 118 thereby permitting the spring 89 to expand engaging sleeves 61 and 71 (see Fig. 11). In Fig. 13c, the cam is rotated to the reverse position with the flat 119 engaging the lever 105 permitting the spring 90 to expand engaging sleeves 68 and 71 (see Fig. 12). Stops 120, 121 are mounted on the exterior of the housing 51 for engaging the lever 102 and limiting rotation of the cam 99.

The clutch of the invention may be engaged and disengaged while operating at full load and is especially suited for use in high-torque, low-speed applications. Only a very small mechanical motion is required for actuating the clutch, since it is only necessary to move the constrained end of the spring out of engagement with the tapered surface. The clutch of the invention will handle a large power for its size. For example, a clutch as shown in Figs. 1 through 5 having a spring with a one inch diameter coil formed of .072 inch diameter music wire, handles 5 horsepower at 150 r.p.m. This particular clutch is used on gasoline engine driven lawnmowers with the clutch positioned at the low speed side of the gear reduction unit. A dual speed transmission constructed as shown in Figs. 6 through 14 using springs with a one inch coil diameter of .125 inch diameter music wire handles in excess of 10 horsepower at 1000 r.p.m.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a clutch for a transmission or the like, the combination of: a stationary member; a first member journalled in said stationary member for rotation about an axis in a positive direction, said first member including a first tapered surface; a second member journalled in said stationary member for rotation about said axis, said second member including a second tapered surface coaxial with and facing said first tapered surface; a coil spring positioned between said tapered surfaces with each end of said spring being constrained to a predetermined maximum diameter, one end of said spring being engageable with said first tapered surface and the other end of said spring being engageable with said second tapered surface, the turns of said spring winding around said axis away from said one end towards said other end in a negative direction, and means carried on said stationary member for axially compressing said spring.

2. In a clutch for a transmission or the like, the combination of: a stationary member; a first member journalled in said stationary member for rotation about an axis in a positive direction, said first member including a first tapered surface; a second member journalled in said stationary member for rotation about said axis, said second member including a second tapered surface coaxial with and facing said first tapered surface; a coil spring positioned between said tapered surfaces with one end of said spring engageable with said first tapered surface and the other end of said spring engageable with said second tapered surface, the turns of said spring winding around said axis away from said one end towards said other end in a negative direction; a first apertured cup for receiving said one end of said spring to constrain one end to a predetermined diameter; a second apertured cup for receiving said other end of said spring to constrain said other end to a predetermined diameter; and means carried on said stationary member for moving said cups toward each other to axially compress said spring.

3. In a clutch for a transmission or the like, the combination: a stationary member; a first member journalled in said stationary member for rotation about an axis in a positive direction, said first member including a first tapered surface; a second member journalled in said stationary member for rotation about said axis, said second member including a second tapered surface coaxial with and facing said first tapered surface, a coil spring positioned between said tapered surfaces with each end of said spring being constrained to a predetermined maximum diameter and with one end of said spring being engageable with said first tapered surface and the other end of said spring being engageable with said second tapered surface, the turns of said spring winding around said axis away from said one end toward said other end in a negative direction; a first lever pivoted in said stationary member with said first lever engageable with said one end of said spring; a second lever pivoted in said stationary member with said second lever engageable with said other end of said spring, and means for pivoting said first lever to move said one end of said spring away from said first tapered surface, said first lever including means for engaging said second lever to pivot said second lever counter to said first lever to axially compress said spring.

4. In a multispeed transmission, the combination of: a stationary member; first, second, and third sleeves rotatably mounted in said stationary member with said second sleeve fixed to a shaft and said first and third sleeves journalled on said shaft on opposite sides of said second sleeve, said first sleeve being rotatable about an axis in a positive direction and having a tapered surface facing said second sleeve, said second sleeve having a pair of tapered surfaces facing away from each other toward said first and third sleeves, respectively, said third sleeve having a tapered surface facing said second sleeve; countershaft means for coupling of said first and third sleeves; a first coil spring positioned between the facing tapered surfaces of said first and second sleeves for engagement therewith, the turns of said first spring winding around said axis away from said first sleeve toward said second sleeve in a negative direction; a second coil spring positioned between the facing tapered surfaces of said second and third sleeves for engagement therewith, the turns of said second spring winding around said axis away from said third sleeve toward said second sleeve in a direction opposite to the direction of rotation of said third sleeve; four apertured cups with each cup receiving an end of a spring to constrain the end to a predetermined diameter; and means carried on said stationary member for moving the pairs of cups constraining each spring together to axially compress the spring.

5. In a dual speed transmission, the combination of: a stationary member; first, second, and third sleeves rotatably mounted in said stationary member with said second sleeve fixed to a shaft and said first and third sleeves journalled on said shaft on opposite sides of said second sleeve, said first sleeve being rotatable about an axis in a positive direction and having a tapered surface facing said second sleeve, said second sleeve having a pair of tapered surfaces facing away from each other toward said first and third sleeves, respectively, said third sleeve having a tapered surface facing said second sleeve; countershaft means for coupling of said first and third sleeves; a first coil spring positioned between the facing tapered surfaces of said first and second sleeves for engagement therewith, the turns of said first spring winding around said axis away from said first sleeve toward said second sleeve in a negative direction; a second coil spring positioned between the facing tapered surfaces of said second and third sleeves for engagement therewith, the turns of said second spring winding around said axis away from said third sleeve toward said second sleeve in a direction opposite to the direction of rotation of said third sleeve; four apertured cups with each cup receiving an end of a spring to constrain the end to a predetermined diameter; first lever means pivoted in said stationary member and engageable with the cups at each end of said first spring for axially compressing said first spring; second lever means pivoted in said stationary member and engageable with the cups at each end of said second spring for axially compressing said second spring; and a cam movable between first, intermediate, and second positions, said cam engaging said first lever means when in said first position to compress said first spring and engaging said second lever means when in said second position to compress said second spring and engaging both of said lever means when in said intermediate position to compress both of said springs.

References Cited in the file of this patent

UNITED STATES PATENTS

| 1,298,975 | Lindsay | Apr. 1, 1919 |
|---|---|---|
| 1,641,418 | Elsey | Sept. 6, 1927 |
| 1,718,197 | Starkey | June 18, 1929 |
| 1,971,955 | Hoelscher | Aug. 28, 1934 |
| 2,010,718 | Hartsock | Aug. 6, 1935 |
| 2,507,733 | Mott | May 16, 1950 |
| 2,698,678 | Dale et al. | Jan. 4, 1955 |
| 2,833,383 | Christensen | May 6, 1958 |